(12) United States Patent
Dehnert et al.

(10) Patent No.: US 10,186,095 B2
(45) Date of Patent: Jan. 22, 2019

(54) SYSTEMS AND METHODS RELATED TO DOOR CONTROL NETWORKS (71) Applicant: JNL Technologies, Inc., Ixonia, WI (US)

(72) Inventors: Drew D. Dehnert, Ixonia, WI (US);
James P. Gleason, Ixonia, WI (US);
Anthony L. Kunda, Oconomowoc, WI (US)

( * ) Notice: Subject to any disclaimer, the term of this patent is extended or adjusted under 35 U.S.C. 154(b) by 0 days.

(21) Appl. No.: 15/364,414

(22) Filed: Nov. 30, 2016

(65) Prior Publication Data

US 2018/0151008 A1 May 31, 2018

(51) Int. Cl.
*G07C 9/00* (2006.01)
*H04B 17/318* (2015.01)
*H04L 29/06* (2006.01)
*H01H 36/00* (2006.01)
*H04W 12/08* (2009.01)
*H04W 4/33* (2018.01)
*G08B 21/22* (2006.01)

(52) U.S. Cl.
CPC ...... *G07C 9/00103* (2013.01); *G07C 9/00119* (2013.01); *G07C 9/00174* (2013.01); *G07C 9/00309* (2013.01); *G07C 9/00571* (2013.01); *H01H 36/0013* (2013.01); *H04B 17/318* (2015.01); *H04L 63/102* (2013.01); *H04W 4/33* (2018.02); *H04W 12/08* (2013.01); *G07C 9/00111* (2013.01); *G07C 2009/00769* (2013.01); *G08B 21/22* (2013.01)

(58) Field of Classification Search
CPC ...... G07C 2009/00769; G07C 9/00111; G07C 9/00309; G07C 2009/00325; G07C 2009/00412; G07C 2009/00793; G07C 9/00007; G07C 1/10; G07C 2009/00507; G07C 2009/00642; G07C 9/00103; G07C 9/00896; G06K 7/10366; G07B 15/02; H01Q 1/2225; H01Q 21/00; H01Q 3/26; H01Q 9/0407; H01Q 9/0421; H04W 40/244; H04W 4/008; G08B 21/22; H01H 36/0013; H04B 17/318; H04L 69/162
See application file for complete search history.

(56) References Cited

U.S. PATENT DOCUMENTS

| 2005/0044906 | A1* | 3/2005 | Spielman | G07C 9/00166 70/63 |
| 2015/0296347 | A1* | 10/2015 | Roth | H04W 4/04 705/326 |
| 2015/0351369 | A1* | 12/2015 | Frazier | A61D 17/00 340/573.2 |

(Continued)

*Primary Examiner* — Dionne H Pendleton
(74) *Attorney, Agent, or Firm* — Smith Keane LLP (57) ABSTRACT

Systems and methods of ingress/egress control and monitoring and area monitoring include networked modules having wireless communications capability. Modules detect wireless communications transmitters within a particular range of the modules. The modules also monitor status of ingress and egress through doors and door status. Door access control is provided in a centralized database through a system server and distributed to each module to operate as a stand-alone module in the event of disconnection from the system server. Modules repeatedly monitor the system server for programming updates and provide information to the system server for reporting.

14 Claims, 5 Drawing Sheets

(56) References Cited

U.S. PATENT DOCUMENTS

| | | | | |
|---|---|---|---|---|
| 2016/0055690 | A1* | 2/2016 | Raina | G07C 9/00007 340/5.61 |
| 2017/0084103 | A1* | 3/2017 | Ribbe | G07C 9/00706 |
| 2017/0148243 | A1* | 5/2017 | Shin | G07C 9/00111 |

* cited by examiner

SYSTEMS AND METHODS RELATED TO DOOR CONTROL NETWORKS

BACKGROUND OF THE INVENTION

The present invention relates to a door control network, and more particularly to a system to control ingress and egress of employees, residents, clients, and/or visitors in a multi-door facility, for example a Long Term Care (LTC) facility. Systems according to the present invention may also be used as call systems, such as nurse or aide call systems.

Prior door control systems available in the marketplace for LTC facilities were typically a multi-system design. For example, a first system for monitoring residents' locations to prevent residents from leaving the facility, called a "wanderer monitoring" system, and a second system to prevent access to a building or specified locations in a building by unauthorized people, called an "Access Control" system. Additional systems could also be installed to connect and control everything at the main entrance or at various other doors throughout the facility, including door bells, intercom systems, and time clocks. Furthermore, multiple vendors would be needed to install and service the various systems, which would not likely be able to integrate with one another.

Due to these factors, the installation, servicing, utilization, and monitoring of multiple systems is cost prohibitive, or at the very least cumbersome and inefficient, to use in many LTC facilities and could drive some LCT facilities to install a system that does not meet all of its actual needs.

Therefore, there is a need for a more efficient and cost effective door control system that incorporates multiple functionalities, including a wander monitoring system, an Access Control system, and other additional systems.

SUMMARY OF THE INVENTION

The present invention relates to a system and method for a door control system. The door control system incorporates multiple functionalities including a wander monitoring system, an access control system, and other additional systems.

According to an aspect of an embodiment of a system according to the present invention, such system includes at least one door control system and/or area monitoring unit and at least one beacon device. The door control system includes a microprocessor electrically coupled to a wireless communications transceiver and electronic memory. The door control system further includes at least one electrical output. The processing functionality may be divided between two or more microprocessors. The beacon device includes a wireless communications transmitter configured to transmit a beacon device identifier. The door control system is programmed or programmable to activate and/or deactivate one or more electrical outputs after the wireless communications transceiver receives the beacon device identifier.

According to another aspect of an embodiment of a system according to the present invention, the wireless transceiver is capable of determining a strength of a wireless transmission (e.g., including the beacon device identifier) received from the wireless transmitter. The programming of the door control system may reference or account for the determined strength of the wireless transmission, such that the activation or deactivation occurs only if the strength of the wireless transmission is above a predetermined level. The wireless transmission may further include a character pattern, such as an ASCII string. The microprocessor may be programmed to compare the character pattern to a predetermined character value and to store the beacon device identifier only if the character pattern matches the predetermined character value.

According to still another aspect of an embodiment of a system according to the present invention, the system may further include a door disposed within a doorway and at least one door latch configured in a first position to prevent the door from opening and in a second position to allow the door to open. The door latch may be an egress lock or an access strike. A magnet may be coupled to the door and disposed proximate an edge of the door. A reed switch disposed in the doorway may be used to determine whether the door is in an open position or a closed position. Thus, the reed switch is in one of an open circuit and a closed circuit when the door is in a closed position and the reed switch is in the other of the open circuit and the closed circuit when the door is in an open position. The door control system may include an electrical input coupled to the reed switch to monitor the closed status of the door and to store that status or communicate it to a server.

According to yet another aspect of an embodiment of a system according to the present invention, the door control system may be electrically coupled to, and capable of communications over, a wired electrical communications network. The door control system may be in communication with a network server over the wired electrical communications network, such as through a network socket connection.

According to a further aspect of an embodiment of a system according to the present invention, the beacon device includes a battery. The beacon device may also include a reed switch to electrically connect the battery to the wireless communications transmitter.

According to still a further aspect of an embodiment of a system according to the present invention, the beacon address identifier comprises a media access control address.

According to an aspect of an embodiment of a method according to the present invention, such method includes receiving at a wireless transceiver a wireless transmission comprising a beacon device identifier. The transceiver may determine the strength of the wireless transmission and the beacon device identifier and signal strength may be retrieved by, or otherwise provided to, a microprocessor. The beacon device identifier may be stored, either in a database over a network, or in local memory if communications over a network is not possible or preferred. The signal strength may be compared to a predetermined value, and based on that comparison (e.g., if the signal strength is greater than the predetermined value), then an electrical output may be activated and/or deactivated so as to operate a door latch.

According to another aspect of an embodiment of a method according to the present invention, a date and/or time of day may be stored and related to the beacon device identifier.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
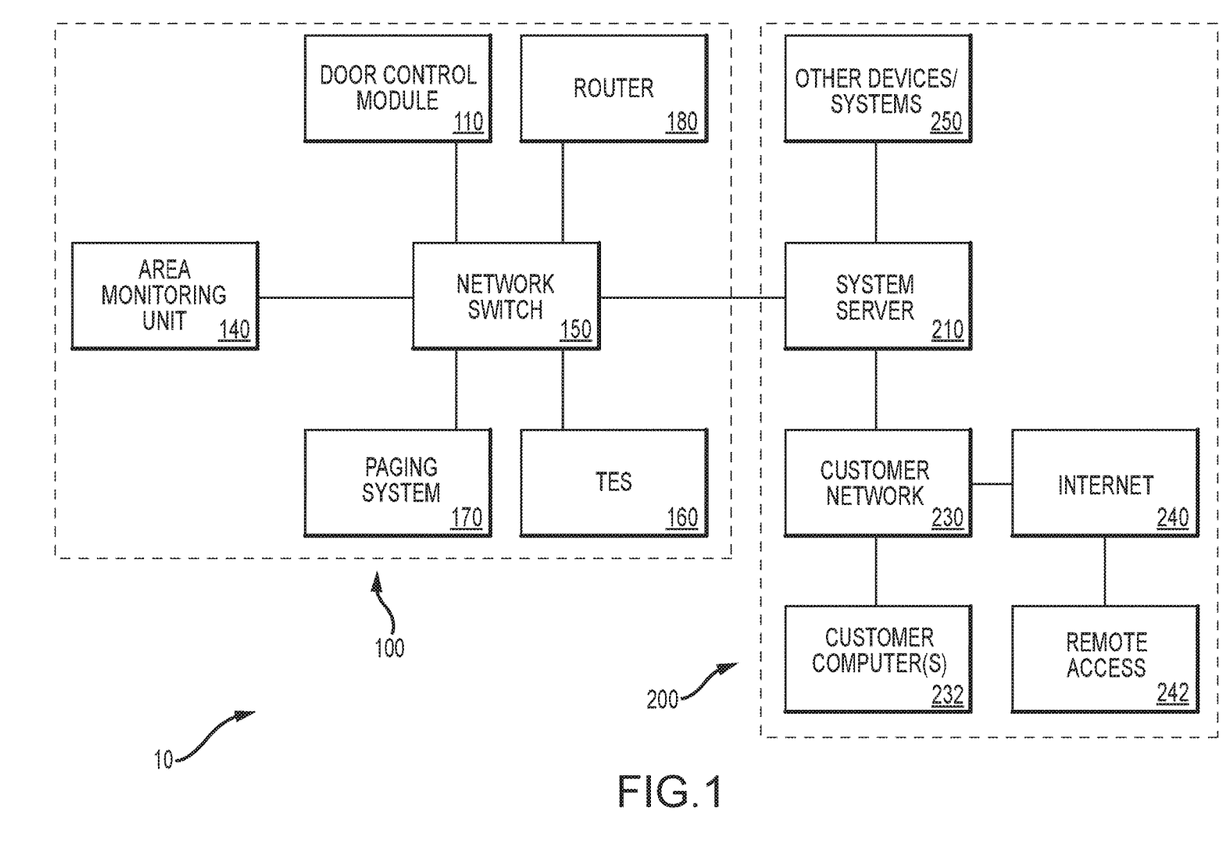
FIG. 1 is a network diagram of a control system according to an embodiment of the present invention.

Referring now to FIG. 1, a control system 100 according to the present invention preferably comprises at least one of a door control system (DCS) 110 and/or area monitoring unit(s) (AMU) 140, and also a network switch 150 in communication with a system server 210 with database. Additionally or alternatively, the control system 100 may comprise multiple DCSs 110 and/or AMUs 140, and/or at least one broadcast device (e.g. anklet, bracelet, tracking tag, etc.) that may be placed in wireless communication with, or be wirelessly detected by, the DCS(s) and/or AMUs. Generally, each DCS may be utilized to control ability of ingress and egress through a door, such as a manway door through which humans or other animals travel. Whereas, each AMU may be utilized to monitor the presence of detectable objects or people within a wireless range of the AMU. For example, an AMU may monitor the presence or absence of objects or people within a room, a hallway, a courtyard, or proximity of an object or person thereto. It should be understood that a DCS is a type of AMU, but a DCS is generally understood herein to have a capability to independently affect the openabilty of a door or other passageway, or to otherwise provide electrical control capability. The system 100 may further include a paging system 170 adapted to transmit notifications to one or more persons via broadcast paging, which may utilize escalation groups to include more persons absent clearing of a page or alarm.

Figure 2:
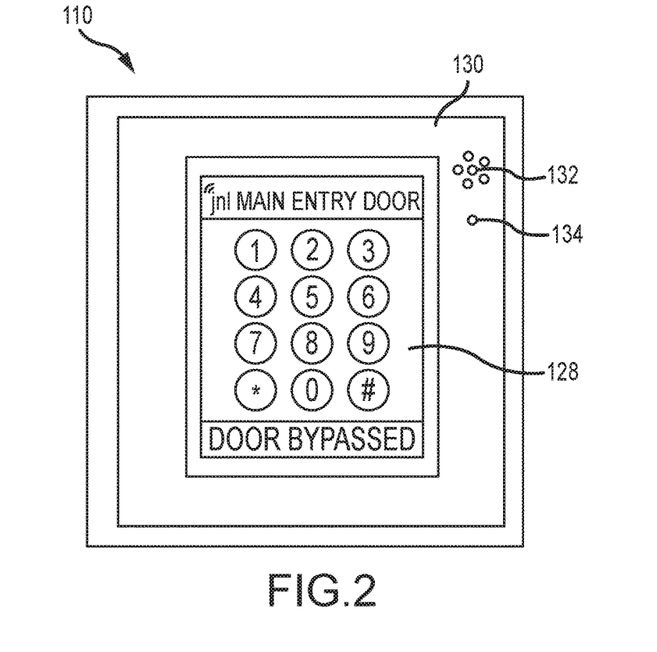
FIG. 2 is a front elevation view of an embodiment of a door control system according to the present invention.
Figure 3:
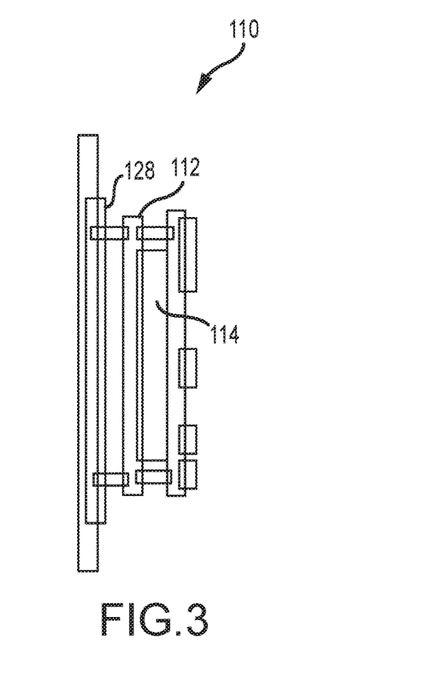
FIG. 3 is a side elevation view of the door control system shown in FIG. 2.
Figure 4:
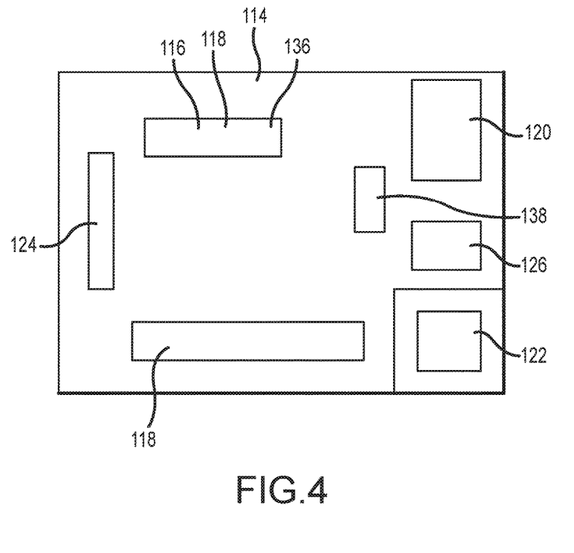
FIG. 4 is a top plan view of a daughter board from the door control system shown in FIG. 2.

A preferred embodiment of a DCS 110 is shown in greater detail in FIGS. 2-4. The DCS 110 is preferably installed proximate a door, and placed in electrical, mechanical or electromechanical communication with a door lock associated with the door, for which control, monitoring, and/or signaling is desired. The DCS 110 preferably comprises an embedded computer 112 (e.g. motherboard including a single board computer programmable with abstracted code) which may interface a daughterboard 114 (see FIG. 4) and a touchscreen 128 housed within a faceplate 130. An example of a single board computer is a Raspberry Pi board, including an ARM 11 processor (e.g., ARM1176 or similar) operating on a LINUX platform kernel.

The daughterboard 114 preferably comprises a microprocessor (and associated memory) 126, a plurality of inputs 116, a plurality of outputs 118, a wireless transceiver (e.g., a Bluetooth 4.0 (Bluetooth LE) transceiver) 120, a network connection 122, a power input/output block 124, and memory, which may include volatile and/or nonvolatile memory.

The plurality of inputs 116 are preferably electrically connected to the touchscreen 128 (e.g., to allow input of personal identification numbers or patterns), the BLE transceiver 120, and a verification input 138 (e.g., RFID reader or Wiegand card reader) to allow authorized personnel to perform actions at the DCS 110. At least one of the plurality of inputs may receive control based on exterior weather conditions (e.g., weather override), other monitoring systems (e.g., fire override), scheduling, or other lockdown conditions (e.g., lockdown override). The plurality of inputs 116 may, when activated, be used to trigger software alarms, to activate or deactivate one or more of the plurality of outputs 118, or to otherwise be utilized as needed. Examples of standard pre-programmed options include, "request-to-enter" and "request-to-exit" options. As non-limiting examples, other devices which may be electrically connected to the plurality of inputs 116 include: reed switches (12 in FIG. 5) to monitor the position of a door, motion detectors (14 in FIG. 6), and doorbell pushbuttons (16 in FIG. 6). For example, a reed switch may detect an open door when the door is supposed to be closed and this input could trigger the speaker 132 and/or other signaling device (e.g., strobe light) to provide a local alarm and/or notify nursing staff via the paging system 170, or electronic typographical messages, such as email or text messages.

Figure 5:
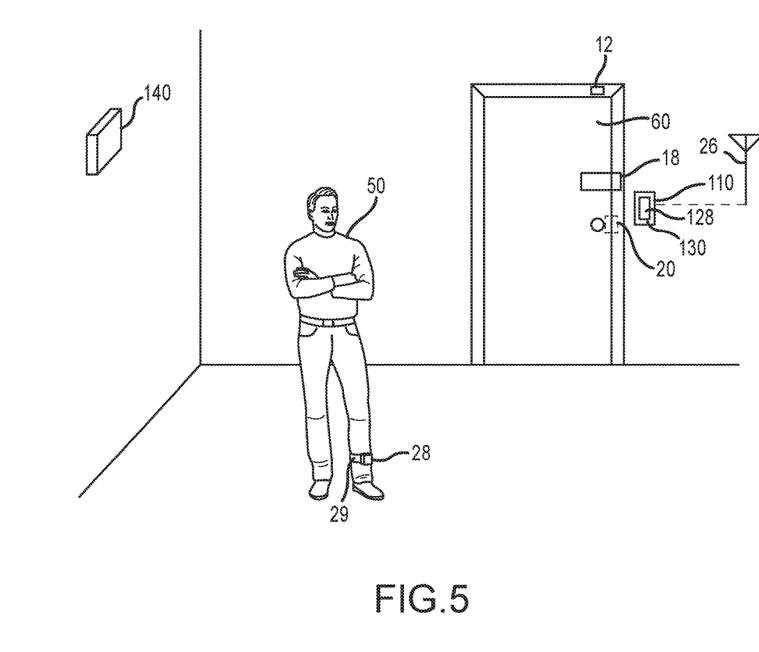
FIG. 5 is an elevation view of a person in an area near a door controlled according to the present invention.
Figure 6:
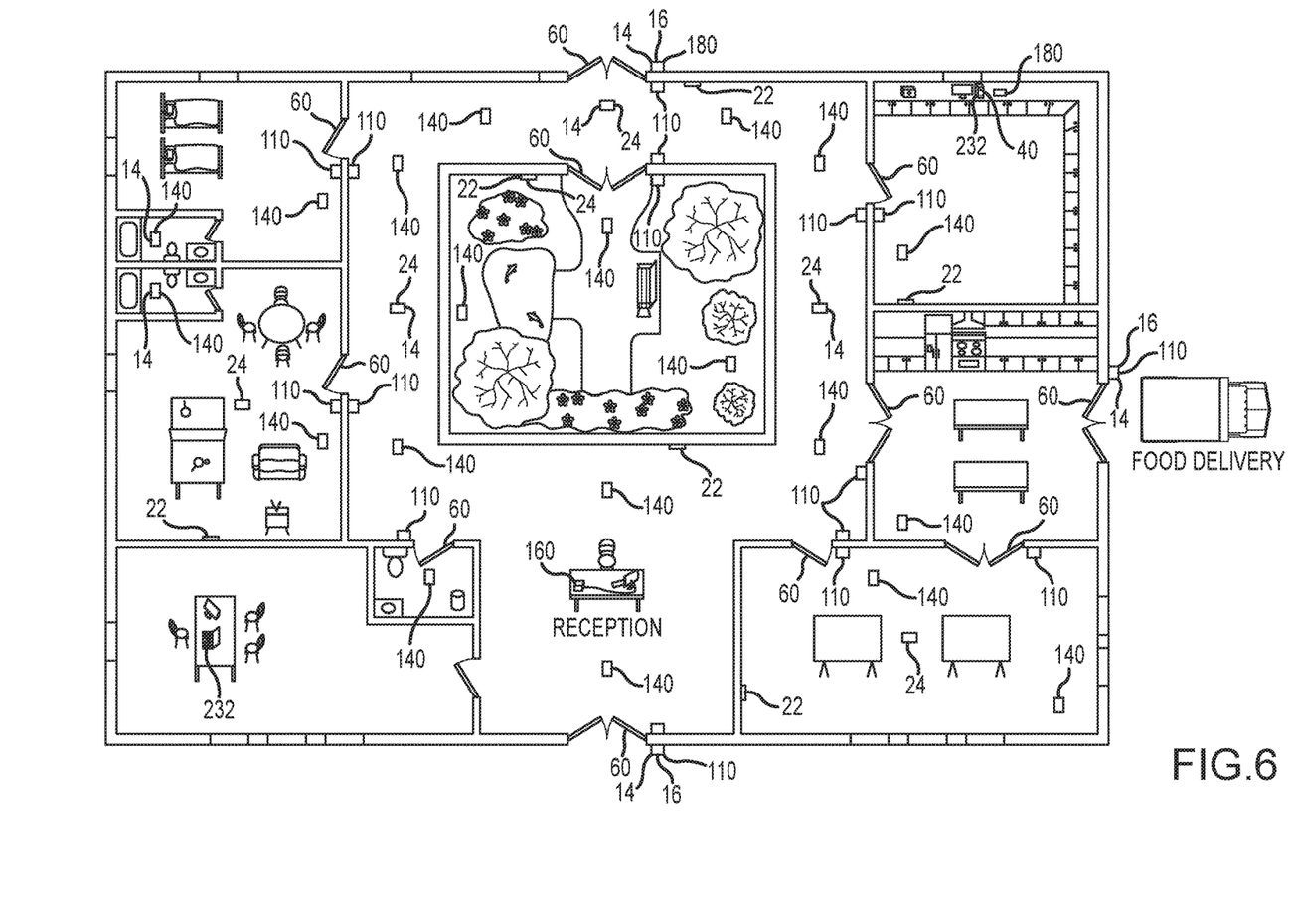
FIG. 6 is a top plan view of a facility layout utilizing systems according to the present invention.

With reference also to FIGS. 5 and 6, the plurality of outputs 118 are preferably electrically connected to a speaker or other sounding device 132, the touchscreen 128, and a plurality of programmable switches (e.g. Form C relays) 136. As non-limiting examples, other devices that may be electrically connected to the plurality of outputs 118 include: door latches (e.g., egress locks and/or access strikes 20), additional sounders 22, strobe lights 24, or to inputs from this or another module or system, such that the DCS 110 may be placed in communicative control of such devices.

The BLE transceiver 120 may be connected to an external antenna 26 and is preferably configured to detect any number of beacon devices (e.g., an anklet 28 including a BLE transmitter (as shown in FIG. 5)) when within a predetermined detection range, including but not limited to, a transmitter worn by a human, an identification badge worn or carried by a staff member, or other transmitter, which may be affixed to an object, such as for inventory or process management (e.g., asset tracking). Generally, a DCS 110 serves as a discovering device (e.g., a scanning device) capable of receiving and interpreting discoverable broadcasts or beacons, such as advertising broadcasts in the BLE standard. The detection range is preferably adjustable for each location at which a DCS 110 is provided and may also be adjustable dependent on the type of transmission received by the BLE transceiver 120. For instance, a DCS may utilize a software filter to recognize and log transmitted beacons from a transmitter that are received with a minimum signal strength. Advertising broadcasts that are not received at such minimum signal strength may be ignored or recorded. The signal strength may be determined using the Received Signal Strength Indicator (RSSI) value, which may be read from the transceiver. The RSSI value may be read and interpreted as a number of decibels or decibel-milliwatts, indicative of a distance between the transceiver in the DCS and a beacon device. Adjustable minimum RSSI levels may be desirable to achieve customizable actions based thereon and/or to customize RSSI levels for particular installations with varied or variable construction materials.

While all wireless transmissions may be detected by the transceiver, a coarse filter may be applied to record information related to advertising broadcasts containing only particular advertising data format(s). For instance, character patterns including one or more particular ASCII coded messages or names may be detected in an advertising broadcast and compared against a predetermined value. If a match is found, that may cause the DCS 110 (through its transceiver) to listen and record data associated therewith.

The action to be taken by a DCS when a BLE discoverable device (for example the anklet 28 shown in FIG. 5) is within the detection range may be customized depending on the specific transmitter recognized. For example, different actions may be taken for various events when a discoverable device is within range of the DCS 110. Examples of actions to be taken include, locking a door (e.g., activating an egress lock), unlocking a door (e.g., releasing an access strike), sending a message to a system server 210 (discussed in more detail below) that a specific device (and hence an associated resident or employee or object) is within a range of a DCS, sending a message to the system server 210 that a resident has been within the detection range of the DCS 110 for a predetermined amount of time, and sending a message to the system server 210 if a resident is within the detection range of the DCS 110 at a time other than when permitted. The action may also include activating a localized alarm made audible at least through the speaker 132 and/or notifying all or certain staff of the event, such as through the paging system 170.

An AMU 140 is preferably located in the facility or area where monitoring and/or signaling is desired. The AMU 140 preferably comprises a BLE transceiver (not shown, but similar or identical to the BLE transceiver 120 of the DCS 110). An AMU 140 may further include at least one input (not shown) which may be connected to at least one of a motion detector (14 in FIG. 6) and an output from another device (e.g., the DCS 110 or another AMU 140). An AMU 140 may include at least one output which may be connected to at least one of a sounder (not shown, but similar to the sounder 132 of the DCS 110) and an input of another device.

As shown in FIG. 1, both the DCS 110 and the AMU 140 are configured to be in communication with each other through a network switch 150 (e.g., an Ethernet router). Also preferably in communication with the network switch 150 is a Tag Enrollment Station (TES) 160 and a router 180 (to serve as a dynamic host configuration protocol (DHCP) host or manager).

The TES 160 preferably comprises a BLE transceiver (not shown, but similar to the BLE 120 in the DCS 110). The TES 160 allows a specific beacon device (for example, the anklet 28 shown in FIG. 5), ID card (not shown), or other identification device to be associated with a person or object to which the transmitter is assigned. Functional parameters may then be associated with that specific device. This information is then shared and stored preferably within at least one of the DCS 110, the AMU 140, and the system server 210 (if so configured; see below). The TES 160 is generally utilized to recognize a transmitter, and the use of the TES may be prompted through a user interface on a customer computer 232. Additionally, the TES 160 may activate a transmitter, such as by using a magnet in the TES to close a reed switch in the transmitter to power it on.

Preferably, the DCSs 110 and the AMUs 140 are powered by a 12 VDC or 24 VDC power supply, preferably with a battery backup. The respective BLE transceivers 120 of the DCS 110, the TES 160, the I/O Board 170, and the AMU 140 may also be used to detect battery status and/or the status of an input in the beacon device. Additionally or alternatively, the BLE transceivers 120 may detect whether a beacon device has been tampered with (e.g., if it has been dissociated from a person or object, such as by severance of a support band (shown as 29 in FIG. 5)) and/or may be used to send a signal to reset/bypass the DCS 110 when the beacon device is used as a staff transmitter.

The control system 100 may be configured to work as an isolated system or integrated with a facility system 200 to provide a facility control system 10 as shown in FIG. 1. The facility system 200 shown here includes the system server 210, a customer network 230 networking at least one customer computer 232, a connection with the internet 240 with the additional capability of providing remote access 242, and any other devices/systems 250.

Preferably, the DCS 110 employs a custom version of a LINUX® computer operating system with a PYTHON™ application as the main program and a MySQL database to allow the DCS to run completely independent from the system server 210; however, other operating system/interface configurations capable of providing the functionality detailed herein are also contemplated. The communication between DCSs/AMUs and the system server 210 may occur over a wired (e.g., Ethernet) or wireless (e.g., IEEE 802.11) communication network. The IP address of the system server 210 is preferably programmed into a database stored in memory of the DCS 110 and a MAC address of the DCS 110 is stored in a database of the system server 210 to allow two-way communication between the DCS 110 and the system server 210, such as through a socket connection.

Preferably, information stored on the database of the system server 210, including resident and staff information, may be accessed through customer computers 233 or the remote access 242 (e.g., virtual private network (VPN)) from which historical reports of events may be populated and/or control of functional parameters may be provided.

Upon powering up the facility control system 10, and in response to queries by the DCSs 110, the system server 210 will send functional parameters to each DCS 110 (and/or AMU 140), identifying the DCS 110 by its MAC address. Functional parameters are preferably stored in the local database of the DCS 110. Examples of the functional parameters include, but are not limited to, locking schedules, input and output programming (for the DCS's respective I/O board), configuration of the touchscreen 128, user information (including authorization to perform door functions), ID codes, card ID numbers, and resident transmitter ID numbers. For example, locking schedules and/or detection/non-detection of resident transmitter IDs may be customizable based on at least one of the time of day, the day of the week, and the location of the DCS 110 in a facility. As another example, the database of the DCS 110 may also include the detection range (or RSSI level) and/or advertising data to be used for beacon filtering.

When the DCS 110 (or AMU 140) and the system server 210 are in communication, such as over a wired or wireless LAN, the DCS 110 will repeatedly monitor the system server 210 to check if any changes have been made to any functional parameters that the DCS needs to be aware of. If a parameter has been modified, the system server 210 will update its database (i.e., thus making it a dynamic database) and set a "flag" for each affected DCS 110. Preferably each DCS 110 will monitor the system server 210 for flags at a predetermined time interval while communication exists between the DCS 110 and the system server 210. A preferred predetermined time interval is about one minute; a more preferred predetermined timed interval is about 30 seconds; and a most preferred predetermined timed interval is about three to five seconds, though a lesser time interval may occur. A preferred method of DCS monitoring of the system server 210 is through a socket connection, such as a MySQL socket connection, to review data stored at the system server 210 and related to the particular DCS 110.

Each DCS 110 and AMU 140 preferably monitors and records detectable events communicating some or all of the events to the system server 210 and assigning each an event code. If communication between the DCS 110 and the system server 210 is cut off for any reason, the DCS 110 stores the event in its respective local database and will continue to operate based on the most recent communication and programming having been received from the system server 210 and the DCS 110 will log all events that occur in its local database until communication is restored at which point the database of the system server 210 will be updated to include the information included in the database of the DCS 110.

Turning now to FIGS. 5 and 6, interaction between a beacon device and one or more of a DCS 110 and AMU 140 may be explained. As shown in FIG. 5, a beacon device (such as an anklet 28) may be secured to a person 50 or other object or animal. The device 28 may be secured with a strap 29. The strap 29 may provide an electrical connection between two points within the anklet 28, which may be monitored to determine whether the electrical connection is broken, such as if the strap 29 is severed. The anklet 28 includes a battery to power an electrical circuit carried within the anklet 28. The electrical circuit provides the capability for the anklet 28 to be a discoverable beacon device. That is, the circuit preferably includes at least a wireless communications transmitter capable of transmitting a beacon, such as an advertising broadcast according to the BLE standard. The broadcast preferably occurs at a rate of at least once every few seconds, but preferably at a rate of once every second, and most preferably about every half-second.

A beacon device broadcast may be detected by at least one DCS 110 and/or an AMU 140. The DCS 110 is associated with a door 60. The DCS 110 may monitor inputs, such as from a reed switch 12 to detect whether the door 60 is open or closed. The DCS 110 also controls outputs to control at least one of an egress lock 18 and an access strike 20. If a broadcast from the beacon device 28 is detectable by the DCS 110 (using an internal or external antenna 26) an identifier of the device 28 (such as a MAC address) is recorded by the DCS 110 along with a time stamp, and the information transmitted to the system server 210. Based on access rules, as further described below, openability of the door 60 may be controlled by the DCS 110. That is, if the device identifier is scheduled or otherwise allowed access through the door 60, then the DCS 110 will control an output to deactivate a door lock 18 and/or release an access strike 20. Alternatively or additionally, even if access is to be allowed, the door 60 may remain locked until a secondary identifier (e.g., personal identification number, magnetic swipe card, or biometric identifier (e.g., fingerprint or retinal scan)) is provided for authorized access. If the device identifier is scheduled or otherwise denied access through the door 60, then the DCS 110 will control an output to activate a door lock 18 and/or secure an access strike 20. As indicated above, these actions may be customized based on the RSSI of the advertising broadcast received by the DCS 110, so as to customize the distance between the device 28 and the door 60 at which time the unlocking or locking actions are undertaken. These RSSI level customizations may be undertaken the same for each and every beacon device associated within a system, or they may be customized based on a particular door 60 and/or a particular person 50 and/or time schedule.

FIG. 6 shows an exemplary facility layout including a plurality of doors 60, some of which are associated with one or more DCSs 110. A plurality of AMUs may also be provided so as to monitor particular areas of the facility. It is to be understood that a beacon from a beacon device (e.g., anklet 28) may be detectable by a plurality of DCSs 110 and/or AMUs 140. In this way, locations of beacon devices 28 may be monitored and access through doors 60 may be controlled as described herein.

In use, one or more DCSs and/or AMUs are installed in a facility, such as a housing facility, medical facility, or long term care facility. All of the DCSs and AMUs are communicatively coupled to the system server, which includes its database. Each DCS or AMU is identified in the database, and provided with a unique identifier, such as a door name or area name. The control parameters for each DCS and AMU may be programmed and stored in the system server database.

Once the DCSs and/or AMUs are installed and communicatively coupled to a system server with database, a beacon device, such as a wristband, anklet, or tag, including a BLE transmitter, is registered with the system server database. Information is associated with the transmitter, including at least an identification (e.g., person's name and/or ID number). Once a transmitter is enrolled with or entered into the system server database, then the transmitter may be monitored by the system. Additionally or alternatively, if an unknown transmitter is detected by a DCS or AMU, information related thereto may be automatically logged under a unique identifier (e.g., MAC address) prior to enrollment.

In a user interface provided through a computer communicatively connected to the system server, options may be provided to present information or control options to a user, such as a dashboard display; a map display; a door control display; a schedule display; a resident display; a device display; a staff display; a site display; and a report display. Some displays allow a user to view information stored in the system server database, having been received from the DCSs and AMUs. Some displays allow a user to enter information into the system server database to control the system.

Regarding a dashboard display, a graphical dashboard may be provided, to present a predetermined number (e.g., 10) of most recent status alerts to a user. Status alerts may be provided as alarms (e.g., in a red color) or as information, (e.g., in a yellow color).

A map display user interface may also be provided through a computer communicatively connected to the system server. Information from the system server database, may be used to construct or overlay a map of a facility with information related to status of DCSs or AMUs, information related to discovered transmitters, and alarms that may have been triggered.

A door control display may provide information related to a status recognized by each DCS and/or AMU and may allow a user to create, change and/or remove staff access groups defined for a particular DCS or AMU. Displayed door status information may include status indicators, such as whether an alarm has been triggered, whether the door has been breached, whether the door is open or closed (door position), whether the door appears to be propped open (when it should be closed), whether the door is locked or unlocked, whether there has been egress through the door, whether the DCS is in communication with the system server or not (online/offline), and whether any door control parameters have been overridden. Staff access groups may be defined by a user to include certain employees or service providers within predefined groups, so that such groups may be assigned door or area access privileges according to predefined schedules. Definition of staff access groups involves associating one or more individuals (previously associated with a wireless transmitter or other identification mechanism) with a staff access group identifier.

A schedule display may allow a user to create, change, or remove, control schedules for any particular DCS or AMU or plurality thereof. A user may define a one-time schedule, a weekly unlock schedule, a weekly lock schedule, a weekly staff schedule, and/or a monitor schedule. The schedules may apply to all operation of a particular door controlled by a DCS or they may apply to operation of a particular door during the detected presence of a particular transmitter or group of transmitters. A one-time schedule is a schedule to control ability to open a door. For instance, it may be a period of door unlock or a period of door lock. A particular DCS may be selected, a start time and an end time may be selected, and a lock behavior may be selected. Once programmed, the system server sets a flag for the selected DCS to receive the schedule. The DCS will receive the schedule and may apply the one-time schedule prioritized over any other schedule previously programmed, if any. A weekly unlock schedule may be defined to program a DCS to unlock a door at given times every week. Thus, for example, if an area of a facility is used for general public use every Wednesday night from 6:00 p.m. to 9:00 p.m., then one or more DCSs controlling doors allowing passage to the facility area may be programmed to be unlocked during that time. Programming again may be accomplished at the system server and flagged and downloaded by the respective DCS(s). A weekly door lock schedule is the inverse of the unlock schedule, and may be used for limiting access through a door. For instance, a DCS may control a door that provides access to a courtyard. It may be desirable to limit access to the courtyard at a particular time of night (e.g. 9:00 p.m.) everyday, or on certain days of the week. Weekly staff schedules may be created to define which staff members (or other defined persons), or defined groups thereof, are allowed to pass through particular doors, the staff members' passage being allowed or disallowed through the use of an identification badge/number/transmitter at a DCS. Monitoring schedules may be defined so as to allow monitoring (i.e., logging of events by a DCS or AMU) during only particular times, rather than constantly. A weather override signal may be provided to control programming of one or more DCSs, which may be particularly useful to control DCSs associated with exterior doors. Information related to inclement weather conditions may be received by the system server through monitoring of particular Internet websites or otherwise received, such as by being manually programmed into the system server database. Upon sensing an inclement weather condition, affected DCSs are flagged and programmed to a weather operative state, such as locked (e.g., for rain, cold, etc.) or unlocked (e.g., for fire). If schedules are not obeyed, primarily by attempted ingress/egress during times not allowed by the in-effect programming, alarms may be sounded and/or staff may be paged to address the issue. As mentioned, schedules are generally preferably programmed into the system server database and then flagged for DCS or AMU update. Additionally or alternatively, a DCS may allow for schedule modification or override by using the user interface at the DCS (e.g., touchscreen 128).

A resident display user interface may provide information related to resident status and may allow a user to create, change, or remove, resident information or schedule. Information displayed may include information from the system server database, including resident name, apartment number, status (e.g., clear or alarm), whether the resident has activated a call button in their apartment, an associated transmitter identification, leave status and/or last known location within the facility. When a resident is created within the system, information related to the resident may be entered into the system server database, including resident name, apartment and an escalation group (identifying an order of persons paged if the resident causes an alarm), call button identification, and/or transmitter identification. A resident's transmitter may also be temporarily turned off through this display interface or a temporary leave may be scheduled, so as to prevent logging of the location of the transmitter associated with the resident and/or to save battery power of the transmitter.

A device display allows a user to view information related to, and to create, change, or remove, devices that interface with the system server, such as wall mounted pull cords or other devices to be monitored. Information displayed may include a device identification or name, the type of input to the system server, an associated apartment or other location, a device status, and a device serial number. The type of input is information related to whether the device is configured to operate with the system server (native device) or whether the system server is configured to receive input from the device (integrated device). Information that may be associated with a device upon device creation includes a device name, whether the device is active or inactive (should it be monitored), an apartment or other location, and/or escalations (what should be done upon activation of the device, e.g., alarm, paging, light flashing, etc.).

A staff display provides information related to employees or other persons such as contractors, and allows a user to create, change, or remove, such information. The staff display allows a user to associate information with a particular staff member, including staff name, personal identification number, door accessibility (including door access group assignment), software access level, and/or communication preferences (e.g., pager number). Displayed information may include a staff status, including staff name and last known location within the facility.

A site display may provide information related to a particular organization in hierarchical form, such as corporate . . . region . . . site . . . area . . . apartment . . . device. The display may provide information related to each level of the organization and a list of next-level options. Each level is preferably provided with programming capability to alter level-specific functionality and associate lower levels with higher levels, including associating devices (transmitters) with a particular apartment, and require (or not) transmitter check-in according to a particular schedule.

A report display preferably organizes and presents information from the system server database. Reports may include an alarm history report, daily event report, daily check-in report, serial number report, and/or system status report. An alarm history report may include information related to the type of alarm, location of the DCS (or AMU) causing the alarm, associated resident name or transmitter ID, alarm start time, alarm end time, and/or response time. A daily event report may include the total number of events logged by the system DCSs and AMUs since midnight, including an event description, location, resident name, staff name, and/or event time. A daily check-in report includes resident names and apartment numbers, indicating whether or not the resident has checked-in according to his/her predefined check-in schedule. A serial number report provides information related to devices associated with the system, such as device serial number, device name, device type and whether staff assistance is required upon a trigger. A system status report provides information related to system errors, missing (or undetectable) transmitters or devices, identification of transmitters having low batteries, active scheduled leaves, active one-time schedules, and/or active one-time schedules with monitoring.

The foregoing is considered as illustrative only of the principles of the invention. Furthermore, because numerous modifications and changes will readily occur to those skilled in the art, it is not desired to limit the invention to the exact construction and operation shown and described. For instance, in FIG. 6, while several AMUs 140 are depicted as used in conjunction with DCSs 110, it is to be understood that there may be areas within a facility that may employ only a DCS 110 or an AMU 140, but not both. Further, though most doors are shown as having one or more associated DCSs 110, it is to be understood that fewer than most doors in a facility may utilize systems and methods according to the present invention. Indeed, perhaps no doors in a facility would use such systems and methods but rather only AMUs 140 may be utilized. While the preferred embodiment has been described, the details may be changed without departing from the invention, which is defined by the claims.

We claim:

1. A system comprising:
    a door control system comprising:
        a microprocessor electrically coupled to a wireless communications transceiver and electronic memory, the wireless communications transceiver positioned a predetermined distance from a manway door;
        a verification input from an identification reader to allow authorized personnel to interact with the door control system;
        a first electrical output;
    a beacon device secured to a human comprising:
        a wireless communications transmitter configured to transmit a beacon device identifier;
    wherein the door control system is electrically coupled to a wired electrical communications network, and capable of communications with a network server and a paging system over the wired electrical communications network,
    wherein, the door control system is programmable to communicate with the paging system after the wireless communications transceiver receives the beacon device identifier, and the paging system is configured to broadcast notifications to one or more persons after receiving a communication from the door control system.

2. A system according to claim 1, wherein the wireless transceiver is capable of determining a strength of a wireless transmission received from the wireless transmitter.

3. A system according to claim 2, wherein the wireless transmission comprises the beacon device identifier.

4. A system according to claim 3, wherein the wireless transmission further comprises a character pattern.

5. A system according to claim 4, wherein the microprocessor is programmed to:
    compare the character pattern to a predetermined character value;
    store the beacon device identifier only if the character pattern matches the predetermined character value; and
    communicate the beacon device identifier to the paging system.

6. A system according to claim 3, wherein the door control system paging system communication is programmed to occur only if the strength of the wireless transmission is above a predetermined level.

7. A system according to claim 1, the system further comprising:
    a door disposed within a doorway; and
    at least one door latch configured in a first position to prevent the door from opening and in a second position to allow the door to open.

8. A system according to claim 7, the at least one door latch being selected from the group consisting of an egress lock and an access strike.

9. A system according to claim 7, further comprising:
    a magnet coupled to the door and disposed proximate an edge of the door; and
    a reed switch disposed in the doorway,
    wherein the reed switch is in one of an open circuit and a closed circuit when the door is in a closed position and the reed switch is in the other of the open circuit and the closed circuit when the door is in an open position.

10. A system according to claim 9, wherein the door control system further comprises an electrical input coupled to the reed switch.

11. A system according to claim 1, wherein the communication with the network server is established through a network socket connection.

12. A system according to claim 1, wherein the beacon device further comprises a battery.

13. A system according to claim 12, wherein the beacon device further comprises a reed switch to electrically connect the battery to the wireless communications transmitter.

14. A system according to claim 1, wherein the beacon address identifier comprises a media access control address.

* * * * *